July 21, 1936.  W. J. SMITH  2,048,037
HYDRAULIC SHOCK ABSORBER
Filed Sept. 11, 1935
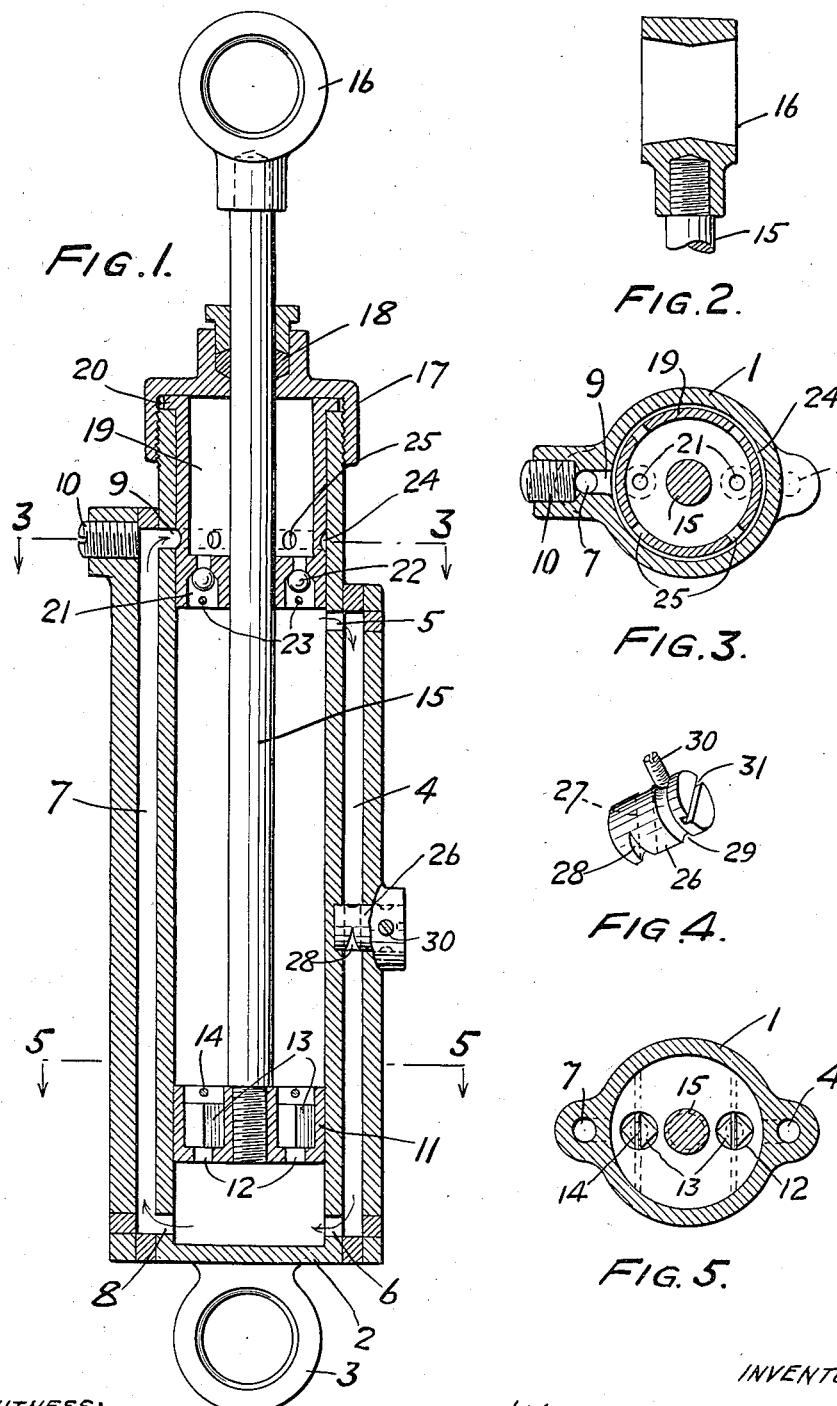
WITNESS:
INVENTOR
William J. Smith
BY
Augustus B. Stoughton
ATTORNEY.

Patented July 21, 1936

2,048,037

UNITED STATES PATENT OFFICE 2,048,037

HYDRAULIC SHOCK ABSORBER

William J. Smith, Philadelphia, Pa., assignor to Jos. B. McCall, Jr., Philadelphia, Pa.

Application September 11, 1935, Serial No. 40,039

4 Claims. (Cl. 188—88)

The object of my invention is to provide a hydraulic shock absorber of simplified and improved construction. One feature of my invention consists in the provision of a reservoir for the shock absorber liquid, said reservoir being located above the acting shock absorber chamber, so that any froth or the like in the liquid is contained in the reservoir and does not get into the acting chamber.

Another feature of my invention is the provision of means whereby the shock absorber can be readily assembled and disassembled without the use of special tools or without exact and intricate movements between the relative parts of the shock absorber.

Other features of my invention will be readily apparent from the annexed drawing and specification to which reference to the details of my invention is made and at the end whereof the novel features of my invention will be specifically pointed out and claimed.

In the drawing:

Fig. 1 is a longitudinal cross-section through my device.

Fig. 2 is a longitudinal cross-section through one of the attaching means at right angles to Fig. 1.

Fig. 3 is a transverse cross-section on line 3—3 of Fig. 1.

Fig. 4 is a detail view in elevation of the bypass valve and the means for retaining it in position.

Fig. 5 is a transverse cross-section on line 5—5 of Fig. 1.

In that embodiment of my invention chosen for illustration and description, my device is shown as consisting of a cylindrical, tubular body 1 having one end 2 thereof closed and having a ring 3 attached to said closed end. Ring 3 serves to connect the shock absorber to one of the operating parts. On one outer surface, body 1 has a bypass channel 4 to which access is had from the interior of the body by means of a passage 5, and from which exit is had through a passage 6. On its opposite side, body 1 carries a return passage for conduit 7, to which inlet is had through opening 8 and from which exit is had through passage 9. A filling plug 10 may be connected adjacent passage 9 or in any other convenient location.

Within body 1 and co-operating therewith, as with a cylinder, is mounted a piston 11 having a plurality of ports 12 extending therethrough. Within a portion of ports 12 are mounted square valves 13, whose smallest transverse dimensions are large enough to close the smaller diameters of ports 12 but which are shorter than the length of ports 12, and are retained in position in ports 12 by pins 14 or similar means. Piston 11 is mounted on a piston rod 15, which bears at its opposite end a second fastening means 16 similar to fastening means 3. The open end of body 1 carries a cap 17 having screw-threaded or other engagement with body 1, and having therein a packing or bushing 18 providing a sliding bearing for piston rod 15.

At the upper end of body 1 there is also provided a reservoir 19 in the shape of a cylindrical cup or chamber having at its upper end an outwardly extending flange 20 adapted to be clamped between the open end of body 1 and cap 17 and to thereby retain the reservoir in position. Lower end of reservoir 19 is closed by a base through which piston rod 15 passes and through which pass ports 21, in which are mounted ball-valves 22 retained in place by pins 23 or like means. On its outer face, reservoir 19 carries an annular groove 24 suitably located so as to be aligned with exit passage 9. A plurality of ports 25 communicate from groove 29 with the interior of reservoir 19.

Bypass passage 4 is controlled by a bypass valve, shown in Fig. 4 as consisting of a body portion 26 having a passage 27 passing therethrough. At one or both ends thereof, passage 27 has a tapering indentation 28 in the outer surface of body 26 or a so-called sneak. The bypass valve also has in its outer surface an annular groove 29, into which projects a screw or like device 30 for retaining the bypass valve on body 1. Bypass valve 26 is adjusted by means of a slot 31 in its outer surface for receiving a screw-driver or like device.

The operation of my device is believed to be obvious. The parts are assembled in the position shown and the device is filled with shock absorber liquid either before cap 17 is screwed into position or through filling plug 10. Shock absorber liquid should be contained in reservoir 19 above the level of ports 25. In use, the valves 13 and 22 are so designed that, upon movement of piston 11 in one direction, both of these valves are closed, thereby trapping liquid between piston 11 and the parts forming the cylinder surrounding the piston. This liquid is forced out through port 5 and bypass passage 4. The amount of the flow of liquid through bypass passage 4 is controlled by valve 26, since passage 27 is aligned with the axis of bypass passage 4. If the passage 27 is turned into alignment with bypass passage 4, the full flow of liquid can pass, but the bypass valve may be turned so that the indentations or sneaks 28 partially overlie the adjacent portions of bypass passage 4, so that flow of liquid through bypass passage 4 is reduced or completely cut off. Upon movement of piston 11 in the opposite direction, both valves 13 and 22 are open, and in addition, liquid can flow from the space between the outer face of piston 11 and the closed end of body 1 through port 8, outlet 9, annular groove 24, and ports 25, to the interior of reservoir 19.

It is to be understood that my invention is not to be limited save as the scope of the prior art and of the attached claims may require.

I claim:—

1. An hydraulic shock absorber, comprising in combination: a cylindrical, tubular body having a closed end and forming part of a cylinder; a piston mounted within said cylinder for reciprocating movement; a piston rod connected to said piston; a cap having in it a sliding bearing for said piston rod and having detachable engagement with said body; a reservoir mounted in the open end of said body and having a flange thereon whereby said reservoir is clamped between said cap and said body; a first valve in said piston and arranged so as to be opened upon movement of said piston in one direction and to be closed upon movement of said piston in the opposite direction; a second valve in said reservoir and controlling a passage leading from the space, which is between said cylinder and said piston and is adjacent to the reservoir, and leading to said reservoir and arranged so as to be opened upon movement of said piston in a direction to open said first valve and to be closed upon movement of said piston to close said first valve; a conduit leading from the space between said cylinder and said piston to the space between the outer face of said piston and the closed end of said body; a bypass valve controlling the flow of shock absorber liquid through said conduit thereby controlling the action of said shock absorber; and a second conduit leading from the space between the outer face of said piston and the closed end of said body to said reservoir.

2. An hydraulic shock absorber according to claim 1 in which the bypass valve consists of a cylindrical body having an opening extending transversely therethrough in alignment with the axis of said second conduit and having a tapering indentation on the outer surface thereof connecting with one end of said opening, said bypass valve having an annular groove in its outer surface, and a screw projecting into said annular groove and retaining said bypass valve against axial movement.

3. An hydraulic shock absorber according to claim 1 in which said reservoir has an annular groove in its outer surface in communication with one end of said second conduit and has a plurality of openings therein leading from said groove to the interior of said reservoir.

4. An hydraulic shock absorber, comprising in combination, a cylinder, a piston mounted for movement in said cylinder, a first valve in said piston arranged so as to be open upon movement of said piston in one direction and to be closed upon movement of said piston in the opposite direction, a wall in said cylinder having a passage therethrough and co-operating with one end of said cylinder to form a reservoir for shock absorber liquid and co-operating with said piston to form a pressure chamber within said cylinder between said piston and said wall, a second valve controlling said passage in said wall which passage connects said reservoir and said pressure chamber, said second valve being arranged so as to be open upon movement of said piston in the direction to opened said first valve and to be closed upon movement of said piston in the direction to close said first valve, a conduit providing communication between said pressure chamber and said reservoir, a bypass valve controlling the flow of liquid through said conduit thereby regulating the action of said shock absorber, and a second conduit leading from the opposite side of said piston from said pressure chamber and from said reservoir and leading to said reservoir.

WILLIAM J. SMITH.